United States Patent
Ang et al.

(10) Patent No.: US 11,461,587 B2
(45) Date of Patent: Oct. 4, 2022

(54) INTELLIGENT VISUAL RECOGNITION TRANSLATION

(71) Applicant: INTERNATIONAL BUSINESS MACHINES CORPORATION, Armonk, NY (US)

(72) Inventors: Ai Kiar Ang, Anchorvale Link (SG); Teck Sang Ho, Singapore (SG); Bernard Chun Yang Ng, Singapore (SG); Kristine Rodelas Bernante, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 17/147,731

(22) Filed: Jan. 13, 2021

(65) Prior Publication Data

US 2022/0222488 A1    Jul. 14, 2022

(51) Int. Cl.
*G06V 20/10*   (2022.01)
*G06K 9/62*    (2022.01)
*G09B 21/00*   (2006.01)

(52) U.S. Cl.
CPC ......... *G06K 9/6256* (2013.01); *G06K 9/6261* (2013.01); *G06V 20/10* (2022.01); *G09B 21/006* (2013.01)

(58) Field of Classification Search
CPC .................. G06K 9/6256; G06K 9/6261
See application file for complete search history.

(56) References Cited

U.S. PATENT DOCUMENTS

| 5,878,154 A | 3/1999 | Shimmelphennig |
| 9,101,459 B2 | 8/2015 | Wexler et al. |
| 2010/0014877 A1 | 1/2010 | Sheflin et al. |

(Continued)

FOREIGN PATENT DOCUMENTS

| AU | 2003215432 B2 | 3/2003 |
| CN | 106389078 A | 11/2016 |
| CN | 108125776 A | 12/2017 |

OTHER PUBLICATIONS

IBM, "z/Architecture—Principles of Operation," IBM Publication No. SA22-7832-11, Twelfth Edition, Sep. 2017, pp. 1-1902.

(Continued)

*Primary Examiner* — Sam Bhattacharya
(74) *Attorney, Agent, or Firm* — Heslin Rothenberg Farley & Mesiti P.C.

(57) ABSTRACT

A method, computer program product, and system include a processor(s) obtaining, captured image data. The processor(s) utilizes an image recognition agent and the captured image data from the defined vicinity to generate and train a model to provide artificial intelligence related to recognizing objects within the captured image data and to designate a location of the recognized objects within a mapped representation of physical space comprising the defined vicinity of the user; mapped representation comprises predefined locations. The processor(s) applies the model to identify one or more objects in the defined vicinity of the user and for each object, presence or absence of the object in each of the predefined locations. The processor(s) determines whether to trigger a notification to the user identifying each object and the predefined locations in which the object is present.

20 Claims, 12 Drawing Sheets

(56) References Cited

U.S. PATENT DOCUMENTS

2016/0267755 A1    9/2016  Martinson et al.
2016/0321880 A1   11/2016  Hamam et al.
2020/0104748 A1*   4/2020  Zucker ................ G06Q 10/087

OTHER PUBLICATIONS

Mell et al., "The NIST Definition of Cloud Computing," National Institute of Standards and Technology, Information Technology Laboratory, Special Publication 800-145, Sep. 2011, pp. 1-7.

* cited by examiner

INTELLIGENT VISUAL RECOGNITION TRANSLATION

BACKGROUND

Visual impairments can affect the way an individual perceives the world around the individual, especially in cases where the visual impairment is sudden and the perceptions of the individual had formerly included visual perceptions, which are presently compromised. Various technological aids have been introduced to assist individuals with visual impairments in perceiving and comprehending external stimuli.

SUMMARY

Shortcomings of the prior art are overcome and additional advantages are provided through the provision of a method for alerting users to the presence of certain objects within the vicinity of the user. The method includes, for instance: obtaining, by one or more processors, based on monitoring a defined vicinity of a user, via one or more input devices communicatively coupled to the one or more processors, the one or more input devices comprising an image capture device, environmental data comprising captured image data; utilizing, by the one or more processors, an image recognition agent and the captured image data from the defined vicinity to generate and train a model to provide artificial intelligence related to recognizing objects within the captured image data and to designate a location of the recognized objects within a mapped representation of physical space comprising the defined vicinity of the user, wherein the mapped representation comprises predefined locations; identifying, by the one or more processors, based applying the trained model to captured image data from a given time, one or more objects in the defined vicinity of the user and determining a location for each of the one or more objects comprising, wherein the location for each object of the one or more objects comprises presence or absence of the object in each of the predefined locations; and determining, by the one or more processors, for each of the identified one or more objects in the defined vicinity, whether to trigger a notification to the user, wherein the notification comprises content identifying an identified object and the predefined locations in which the object is present, and wherein the determining for each of the one or more identified objects is based on a proximity of the object from the user.

Shortcomings of the prior art are overcome and additional advantages are provided through the provision of a computer program product for alerting users to the presence of certain objects within the vicinity of the user. The computer program product comprises a storage medium readable by a processing circuit and storing instructions for execution by the processing circuit for performing a method. The method includes, for instance: obtaining, by the one or more processors, based on monitoring a defined vicinity of a user, via one or more input devices communicatively coupled to the one or more processors, the one or more input devices comprising an image capture device, environmental data comprising captured image data; utilizing, by the one or more processors, an image recognition agent and the captured image data from the defined vicinity to generate and train a model to provide artificial intelligence related to recognizing objects within the captured image data and to designate a location of the recognized objects within a mapped representation of physical space comprising the defined vicinity of the user, wherein the mapped representation comprises predefined locations; identifying, by the one or more processors, based applying the trained model to captured image data from a given time, one or more objects in the defined vicinity of the user and determining a location for each of the one or more objects comprising, wherein the location for each object of the one or more objects comprises presence or absence of the object in each of the predefined locations; and determining, by the one or more processors, for each of the identified one or more objects in the defined vicinity, whether to trigger a notification to the user, wherein the notification comprises content identifying an identified object and the predefined locations in which the object is present, and wherein the determining for each of the one or more identified objects is based on a proximity of the object from the user.

Shortcomings of the prior art are overcome and additional advantages are provided through the provision of a system for alerting users to the presence of certain objects within the vicinity of the user. The system includes a memory, one or more processors in communication with the memory, and program instructions executable by the one or more processors via the memory to perform a method. The method includes, for instance: obtaining, by the one or more processors, based on monitoring a defined vicinity of a user, via one or more input devices communicatively coupled to the one or more processors, the one or more input devices comprising an image capture device, environmental data comprising captured image data; utilizing, by the one or more processors, an image recognition agent and the captured image data from the defined vicinity to generate and train a model to provide artificial intelligence related to recognizing objects within the captured image data and to designate a location of the recognized objects within a mapped representation of physical space comprising the defined vicinity of the user, wherein the mapped representation comprises predefined locations; identifying, by the one or more processors, based applying the trained model to captured image data from a given time, one or more objects in the defined vicinity of the user and determining a location for each of the one or more objects comprising, wherein the location for each object of the one or more objects comprises presence or absence of the object in each of the predefined locations; and determining, by the one or more processors, for each of the identified one or more objects in the defined vicinity, whether to trigger a notification to the user, wherein the notification comprises content identifying an identified object and the predefined locations in which the object is present, and wherein the determining for each of the one or more identified objects is based on a proximity of the object from the user.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
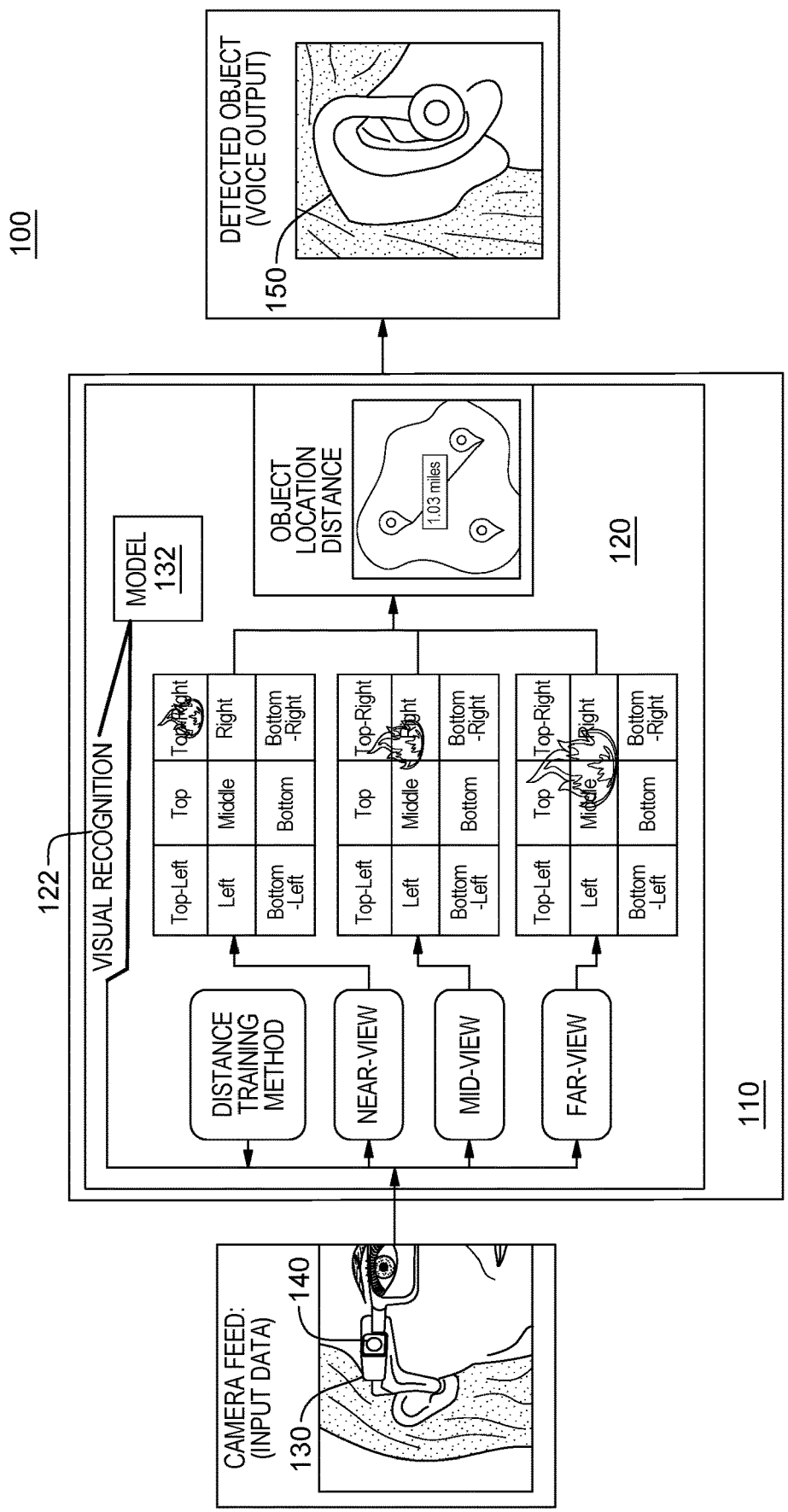
FIG. 1 depicts a technical environment into which aspects of the present invention have been implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 16:
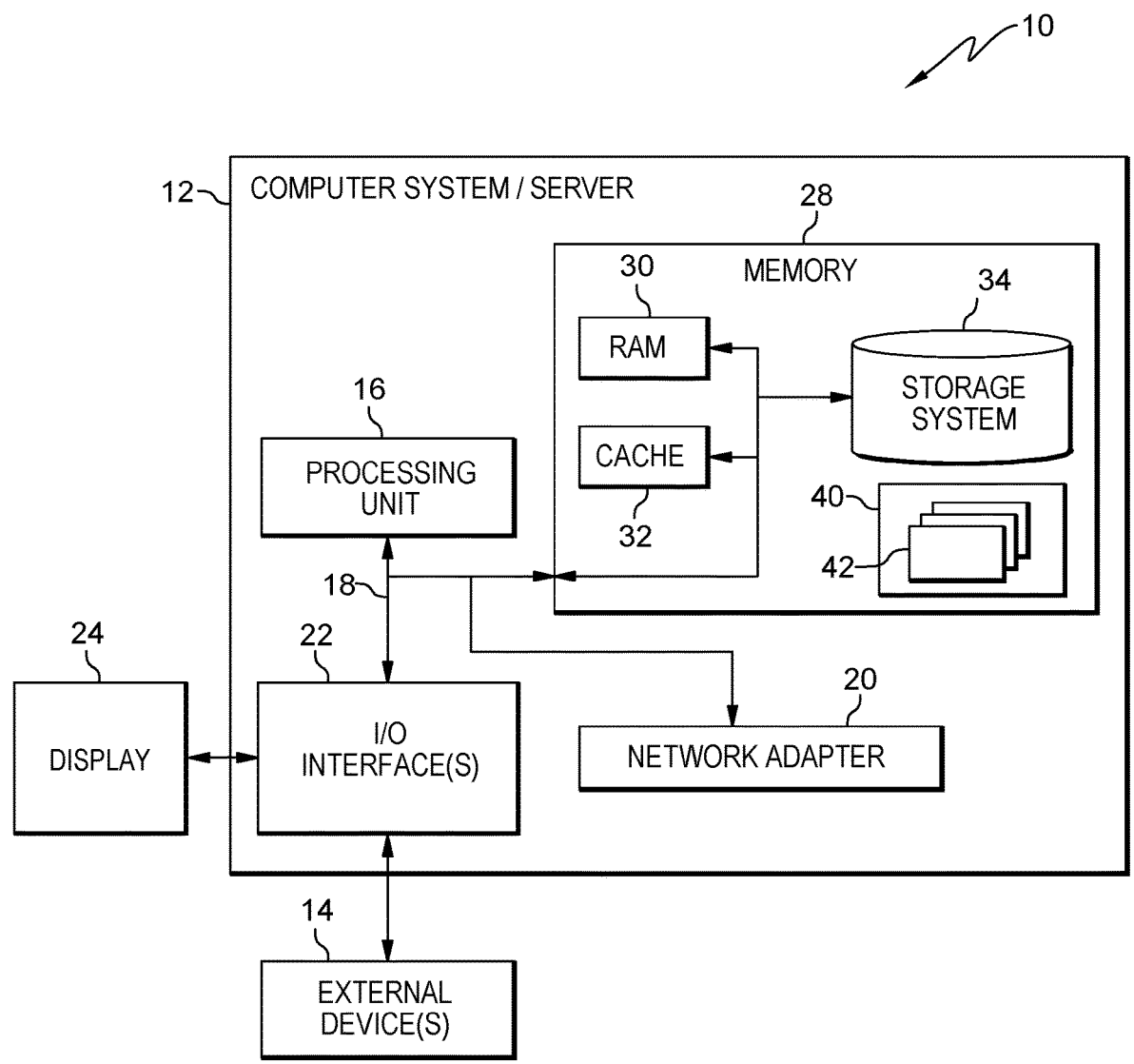
FIG. 16 depicts on embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 16 as program/utility 40, having a set (at least one) of program modules 42, may be stored in memory 28.

Embodiments of the present invention include computer-implemented methods, computer program products, and computer systems that enable users with visual challenges to perceive objects within their vicinity based on a comprehensive real-time translation of these objects within what would be the visual purview of the individual into an auditory comprehensive description. Based on the immediacy and accuracy of these descriptions, the individual is aided in navigating real space and in interacting with objects within this visual purview. Embodiments of the present invention include a personal computing device with imaging capabilities, such as a camera or video recorder, which can be worn or carried by the individual, including but not limited to a body camera and/or a piece of hardware that is attached to or integrated with eyeglasses worn by the individual. In some embodiments of the present invention, to provide the user with real-time descriptive data to enable the user to appreciate the environment without relying on the user's own vision, embodiments of the present invention includes one or more processors executing program code that: 1) utilizes visual recognition tools to build a custom deep learning model and integrate the model into a video/image/camera feed of a personal computing device; 2) applies the deep learning model to the video/image/camera feed from the aforementioned computing device to detect one or more objects within a vicinity of the user; 3) obtains the video/image/camera feed from the aforementioned personal computing device, with the artificial intelligence provided by applying the deep learning model; 4) translates aspects of the video feed and the artificial intelligence into audio (voice), to be delivered to the user via an audio output (which can be heard by the user, including one integrated into the personal computing device, such as an earpiece); 5) based on the translating, provides, via voice/audio, the user with descriptive information about one or more objects perceived by the artificial intelligence in the video feed; the descriptive information includes a location of the one or more objects, relative to the user. In some embodiments of the present invention, the program code (via the voice), informs the user of the location of the detected object based on a grid-defined region. Based on the manner in which the program code provides the information to the individual about one or more objects in the user's vicinity, the user can estimate a distance of each of the one or more objects from the user. As discussed herein, some embodiments of the present invention can operate in three difference modes, referred to herein as default, semi-zoom, and zoom (producing a near-view, a mid-view, and a far-view). The advantages of these modes in the embodiments to which they are relevant are discussed in great detail herein.

Embodiments of the present invention are inextricably linked to computing, provide a practical application, and offer significantly more than other technological approaches to aiding an individual with visual challenges to enhance his/her/their perception of a physical environment, which includes, but is not limited to, alerting individuals, in real-time, to environmental hazards.

Embodiments of the present invention are inextricably linked to computing at least because embodiments of the present invention utilize a body-worn or body-proximate image capture device, such as a camera, and/or an image capture device attached to or integrated into glasses with a visual recognition artificial intelligence (AI) solution to custom-build a deep learning model, and integrate the model into a computing device that obtains the images (e.g., video) captured. In some embodiments of the present invention, this model is self-learning and adapts and changes, altering its application, through the device. To engage in the machine learning to generate and/or continuously update this model, the program code can utilize a neural network (NN), including the program code utilizing supervised, semi-supervised, and/or unsupervised deep learning through a single- or multi-layer NN. As understood by one of skill in the art, NNs are a biologically-inspired programming paradigm which enable a computer to learn from observational data.

Embodiments of the present invention have a practical application at least in that the program code executing on one or more processors (utilizing the hardware and software aspects described in explaining the inextricable linkage to computing) enable a visually impaired or otherwise visually compromised user to recognize risk and danger in the surroundings of the user. Certain practical aspects of some embodiments of the present invention include the program code translating a detected object into a voice notification, to the user, via a sound output, such as an earpiece, worn by the user. As explained herein, the voice notification can indicate a risk level and based on the risk level determined by the program code, the program code can provide the user with an alert (triggered by the risk level), communicating to the user an estimated region of where the object is (e.g., top-right corner) and giving insights to the user based on different views (offered via audio), which are referred to herein as different zoom levels or modes. Additionally, embodiments of the present invention provide a practical application because the program code communicates, via an audio output, to a visually impaired individual, a location of an object detected by the program code, in a manner that enables the user to perceive the location of the object, despite any visual challenges. As will be described herein, the program code can communicate the location of an identified object by using a grid and characterizing the location of the object as a grid-defined region. In some embodiments of the present invention, the use of the program code of the grid-defined location and the different zoom modes or distance modes (e.g., default, semi-zoom and zoom), provides sufficient audio guidance/description, to enable a visually impaired user to estimate a size of the object detected.

The practical applicability of the embodiments of the present invention is particularly observable in a situation where visual elements within view of a user could indicate a danger to the user, but the user's compromised visual perception prevents or negatively impacts the user's perception of the danger. Dangers that can be perceived visually which might not be an apparent to individuals with sight challenges include, but are not limited to, fire and uneven ground. In some embodiments of the present invention, the program code utilizes an audio output to provide the user with alerts that include different levels of risk notifications. The program code determines the risk level of a detected object and triggers an alert based on this risk level. The program code notifications enable a user to estimate a distance of the object from the user. The notification can also provide the user with a relative position of the object, using the grid structure, such that the user can be alerted by the program code of a regional (and relative) location of the object is (e.g., top-right corner). The different zoom levels can provide the user with additional insights into the detected object; the functionality of the zoom levels is described in more detail herein.

Embodiments of the present invention include various aspects that offer significantly more than existing visual assistance systems and methods. These aspects will be discussed in more detail herein. Unlike some existing approaches, in some embodiments of the present invention, program code in embodiments of the present invention trains image detection using representations of distances that enable the program code and the user to estimate distances from detected objects without using a formula. Additionally, the program code segments images obtained via an image capture device to enable recognition of this location, based on a rendering of a grid, by the program code, based on x-y pixels of resolution of the image capture device. Another significant improvement over existing visual assistance approaches is that in some embodiments of the present invention, the program code utilizes machine learning to train images and risk recognition. Also, in certain existing vision assistance solutions, program code incrementally and individually attempts to detect each object within a vicinity of a user, which can be inefficient from a computational standpoint, but can also limit the manner in which accurate information about objects proximate to a user can be communicated to the user. For example, an existing solution could utilize a given method to detect an appendage of a user, such as a finger, and only then, apply the method (e.g., model) again to detect an object relative to that appendage, such as detecting an apple above the finger of the user. Embodiments of the present invention provide a significant improvement over this incremental approach because, as explained herein, in the example of the appendage and the object, the program code applies a model (the method disclosed herein) and detects a location of the object and the appendage with location and distance insight, from the onset. In contrast to some existing methods, which suffer from accuracy issues and provide users with false positives, by training a model to recognize multiple objects with the objects in various sizes, in embodiments of the present invention, the model is trained to recognize objects at a pre-defined distance from a user, which simulates a range of vision for this user (e.g., a real-life scenario where an object is placed near/far from an image capture device) such that objects that are too small or too big in the image might not be recognized, providing the user with a more accurate "view" of the user's field of vision. Some embodiments of the present invention include program code that detects objects accurately within a pre-defined fixed distance (e.g., a field of vision). For example, a model generated by the program code and applied in embodiments of the present invention can be trained by placing objects within a pre-defined distance from an image capture device. The trained model, as applied by the program code, would recognize an object (e.g., an apple) at 2 m away, but if the object were to be placed 10 cm and/or 10 m from the image capture device, the program code in this embodiment of the present invention, would not recognize the object and communicate its location to the user (because the object would be outside of the field of vision of the user). By implementing a simulated visual field for a user, the program code can more accurately estimate object size and distance from an image capture device (which can be worn by the user), and communicate this information to the user.

FIG. 1 depicts a computing system 100 that can be utilized in embodiments of the present invention. The various elements of the computing system 100 communicate over a network, which can include a wireless network, for ease of motion for the users. The computing system includes one or more processors 110, which can be part of a distributed computing environment, including but not limited to a cloud computing environment, executing program code 120. For ease of understanding, the program code 120 in the illustrated embodiment is depicted as a singular object, but as understood by one of skill in the art, program code can be distributed over one or more modules and/or database objects and can be executed on one or more processors 110, with various aspects being executed synchronously and/or asynchronously. The program code 120 can include visual recognition tools 122, including existing visual recognition tools. Two such tools, provided by way of example, only, and not to imply any limitations, which can be utilized (at least in part) in certain embodiments of the present invention are IBM Watson® Visual Recognition and IBM Maximo Visual Inspection.

Returning to FIG. 1, program code 120, in some embodiments of the present invention, can utilize visual recognition tools, which include deep learning algorithms, to analyze images for scenes, objects, text, and other subjects. Program code 120 in some embodiments of the present invention can utilize visual recognition tools 122 (custom and/or third party) as cognitive agents (e.g., AI) to perform one or more of the described analyses. Specifically, in some embodiments of the present invention the program code 120 utilizes visual recognition tools 122 to custom-build a deep learning model 132, and integrate it into a device 130 with or obtaining a camera (image and/or video capture) feed.

As illustrated in FIG. 1, embodiments of the present invention can also include the aforementioned device 130 with an integrated and/or accessible image capture facility 140. The image capture facility 140 provides the device 130 with an image or video feed (also called a camera feed), in real-time or close to real-time. The image capture facility 140 can take various forms but is especially effective when proximate to the user, including being worn by the user, thus, the image capture facility 140 can include a body-worn camera and/or a camera attached to glasses worn by the user. In FIG. 1, the image capture facility 140 is illustrated as a body-worn camera, for ease of understanding, only.

In some embodiments of the present invention, the device 130 and/or the one or more processors 110 are resident on or communicatively coupled to an edge device. An edge device is a device which provides an entry point into enterprise or service provider core networks. Edge devices include, but are not limited to, routers, routing switches, integrated access devices (IADs), multiplexers, and a variety of metropolitan area network (MAN) and wide area network (WAN) access devices. The device 130 of FIG. 1 can be an edge device with embedded artificial intelligence (AI) computing. Thus, the device 130 in embodiments of the present invention, as an edge device, brings AI aspects to the edge, in some technical architectures. Deploying the deep learning model onto an edge device provides mobility to technical architectures of the invention that employ this configuration.

The device 130 in embodiments of the present invention can include the all or some of the one or more processors 110 which execute the program code 120. And the program code 120 can be executed locally, at least in part, on processing resources of the device 130, and/or can be offloaded from the device 130 for processing on another one or more computing resources (not pictured), utilizing distributed computing. Program code 120, which can be executed on the device 130, applies the deep learning model, which it generated and integrated into the device 130 (functionality), such that the model 132 can make an inference that enables the program code to translate a detected object into voice via an audio output 150 that the user can perceive, for example, an earpiece. The model 132 is trained to recognize objects at a pre-defined distance from a user, which simulates a range of vision for this user (e.g., a real-life scenario where an object is placed near/far from an image capture device) such that objects that are too small or too big in the image might not be recognized, providing the user with a more accurate "view" of the user's field of vision. Thus, the program code 120, by applying the model to the camera feed data, informs the user, through the audio output 150 of a location of one or more detected objects, based on a grid-defined region. By providing the user with this information, the user can estimate the user's distance from the one or more objects. The grid representation of location enables the user to perceive the user's distance from an object.

Figure 2:
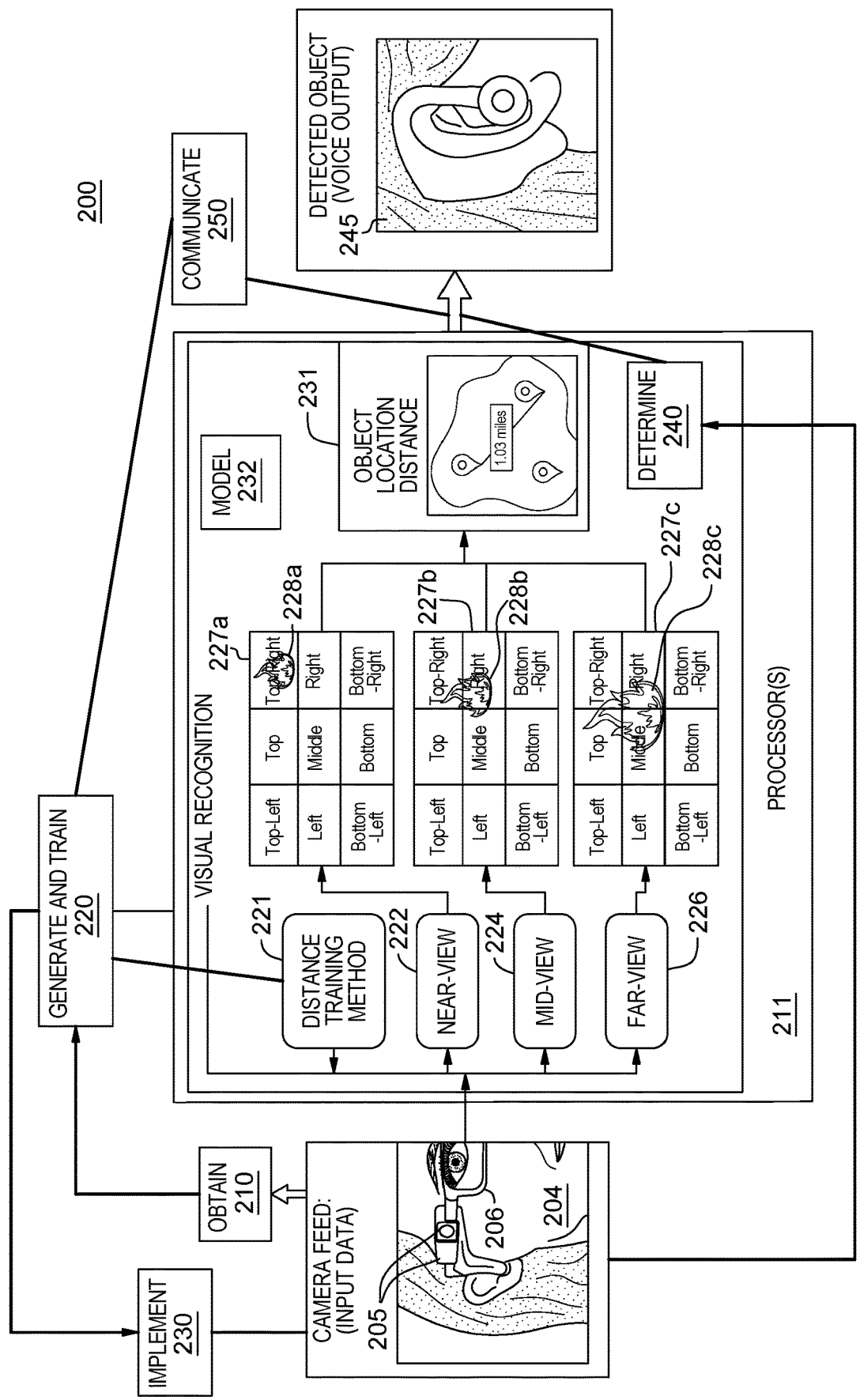
FIG. 2 illustrates a workflow in the context of an example of a technical environments, the workflow illustrating various aspects of some embodiments of the present invention.

FIG. 2 integrates a workflow 200 into the technical architecture of FIG. 1, thus illustrating various aspects of some embodiments of the present invention. As noted when discussing FIG. 1, an audio output and an image capture device are utilized in embodiments of the present invention. In the illustrations of FIG. 2 certain types of these devices are selected and depicted for illustrative purposes only, in order to provide a non-limiting illustrative example. Returning to FIG. 2, in embodiments of the present invention, program code executing on one or more processors 211 comprising a visual recognition module 229 obtains input data (210) from an image capture device 205. In this example, the image capture device 205 is attached to eyeglasses 206 worn by a user 204. The program code generates a custom model (220) based on training the visual recognition module to recognize objects and/or the presence of the objects within a pre-defined distance. As discussed above, this distance translates to the field of vision of a user.

The program code depicted in FIG. 2 as part of the visual recognition module 229, includes a distance training method 221, which trains a custom model 232 that the program code applies to enable a user to perceive (via audio), objects within a defined field of vision at a near-view 222, a mid-view 224, and a far-view 226. These functionalities are separated out for illustrative purposes only, and do not introduce any limitations into the technical architecture. Each of these aspects is comprised of program code that can be separate or combined with another of the aspects and executed on the same or different processing resources, depending on various aspects including, but not limited to, load balancing the system. The program code of the distance training method 221 generates and trains a model 232, which it implements (230). Embodiments of the present invention also include program code that implements the trained model in various view modes. In this example, there are three views generated through training the model, a near-view 222, a mid-view 224, and a far-view 226. In some embodiments of the present invention, these views are implemented based on a selection of inputs (e.g., buttons) by a user, and trigger the program code to implement viewing modes, including but not limited to, a default, a semi-zoom, and a zoom. Use of the modes enables a user to estimate a distance of an object from user.

The distance training method 221 of the visual recognition module 229 includes program code that generates and trains a model 232 to recognize objects within a pre-defined distance (e.g., range) from a user. The pre-defined distance can be understood as a simulated range of vision for a user. To provide the user with a more accurate "view" of the user's field of vision, the mode is trained to operate within a pre-defined distance, approximating a field of vision. The trained model 232, trained in the distance training method 221, is utilized by the program code of the visual recognition module 229 to detect objects accurately within this pre-defined fixed distance (e.g., a field of vision). For example, a model generated by the program code and applied in embodiments of the present invention can be trained by placing objects within a predefined distance from an image capture device. The model is trained utilizing an image feed including data with the objects at the predefined distances (distance training method 221), as applied by the program code. Hence, the program code can utilize the model to recognize/detect objects within a defined field of vision of the user. Using a non-limiting example of a defined distance or field of view, in some embodiments of the present invention, the trained model 232, as applied by the program code, would recognize an object (e.g., an apple) at 2 m away, but if the object were to be placed 10 cm and/or 10 m from the image capture device 205, the program code in this embodiment of the present invention, would not recognize the object and communicate its location to the user (because the object would be outside of the field of vision of the user). By implementing a simulated visual field for a user, the program code can more accurately estimate object size and distance from an image capture device 205, and communicate this information to the user. In embodiments of the present invention that utilize one or more view and/or mode, the field of vision differs in accordance with the view and/or mode utilized/selected by the user.

In embodiments of the present invention, a user can obtain a near-view 222, a mid-view 224, and a far-view 226, via the program code, of a field, by selecting through an input (e.g., haptic, voice, button, etc.) distance gauges. In a view, the program code implements different zoom levels, including, in this example, a default, calibrated to view (and convey a view to a user) a given distance from different perspectives. For example, in some embodiments of the present invention, the user can view/perceive (i.e., have the visuals communicated via audio) a given distance: 1) as that actual distance (an original distance); 2) as a "semi-zoom", which is calibrated to enable to user to view a distance that is further away from the user as if it is the original difference; as a "zoom", which is calibrated to enable to user to view a distance that is further away than the semi-zoom distance, as if it is the original difference. For example, in some embodiments of the present invention, the default is ~2 m, the semi-zoom is ~5 m (zoom level calibrated to view ~5 m as ~2 m), and the zoom is ~10 m (zoom level calibrated to view ~10 m as ~2 m).

Returning to FIG. 2, the program code informs the user of where one or more objects are, when the program code of the visual recognition module 229 recognizes the one or more objects in the input data 210 from an image capture device 205. Taking into account the view and model utilized, the program code determines an object location distance 231 (240), and communicates that distance (250) to the user by generating and delivering audio, via an audio output device 245. FIG. 2 depicts the audio output device 245 as a wearable device proximate to an ear of the user. This device is provided by way of example as any audio output that can be received by the user would operate in a given embodiment of the present invention.

Figure 3:
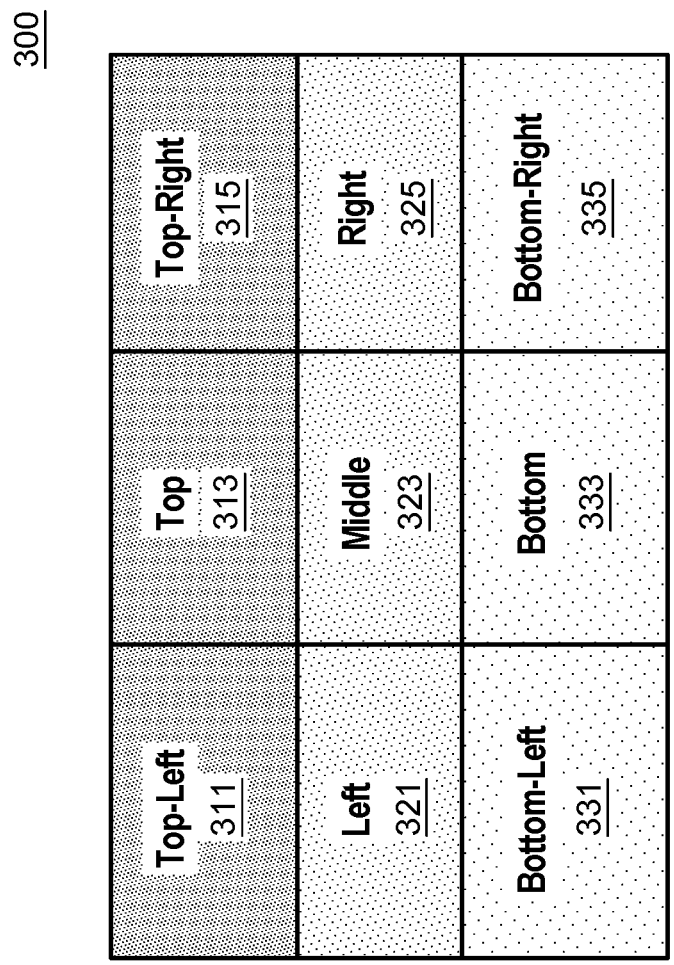
FIG. 3 illustrates certain aspects of some embodiments of the present invention.

The program code communicates a location of a given object 228a-228c to a user based on its orientation in a grid 227a-227c. FIG. 3 is an example of a grid 300 that can be utilized in embodiments of the present invention. The number of spaces in this grid is provided as an example, but this grid allows one to appreciate how the program code can audibly communicate a location to a user of an object and how the user can comprehend the user's proximity to the object based on this communication. The grid 300 of FIG. 3 includes nine spaces (boxes, quadrants, squares, etc.): top-left 311, top (center) 313, top-left 315, left 321, middle 323, right 325, bottom-left 331, bottom (center) 333, and bottom-right 335. The grid segmentation provide location-guidance to a user. For example, the program code can transmit instructions to the audio device to alert the user that a fire is located at the top-right 315. The user can toggle the different views, as depicted in FIG. 2, the near-view 222, mid-view 224, and far-view 226, to appreciate the object (in this case, a fire) 228s-228c at different zoom levels, in order to ascertain the proximity of the user to the object. Thus, the grid segmentation allows the program code to communicate a location of an object to a user, relative to the user (i.e., what direction from the user the object is situated), while the views and zooms allow the user to learn the proximity of the object. FIG. 2 provides illustrations of an object (e.g., a fire), within a view of the user, as it would be communicated and described to the user, within different views enabled by the program code: an object-based near-view, an object-based mid-view, and an object-based far-view. Comparing these views to FIG. 3, in all cases, the object would be communicated to the user as being resident in the top-right 315, but the views and zooms enable the user to learn (via audio) the proximity of the object as well as its size. Hence, a user can estimate the user's distance from the object.

FIGS. 4-15 illustrate various aspects of the functionality of some embodiments of the present invention. Specifically, FIGS. 4-15 illustrates a visual scene that is communicated to a user, via an audio output, in various aspects of the present invention. The visuals are being provided in order to demonstrate the detail in which information is provided to users of embodiments of the present invention. FIGS. 4-15 demonstrate the functionality of some embodiments of the present invention when objects are in and out of motion, the user is in and out of motion, and situations where one of these is moving and the other in stationary. Throughout FIGS. 4-9, a fire is used as an example of an object detected and communicated by aspects of embodiments of the present invention. The example helps illustrate the practical application of the invention in effectively alerting users to dangers within the vicinity of the users. A fire is also used as an example in demonstrating the practicality of aspects of embodiments of the present invention because it is an object without a defined size—the size is not easily measurable and can change in real-time. Thus, by communicating to a user the location of the fire within the context of the grid and the location proximity of the fire, relative the user, utilizing the grid as a reference, a user can appreciated any danger or lack thereof posed by the fire. In FIGS. 10-15, an object used in the examples is a person and the program code indicates the proximity of a user to another person. By contrasting the fire, as an object, and a person, as an object, the figures demonstrate various functionalities of some embodiments of the present invention when the program code detects, models, and communicates, a location of objects of both undefined (fire), and defined (a person) sizes, to a user. Taken together, FIGS. 4-15 illustrate various aspects of some embodiments of the present invention such that one of skill in the art can appreciate how these aspects, as performed by program code executing on at least one processing resource: 1) enables a user, even one with vision challenges, to recognize risk and danger (e.g., fire, uneven ground, etc.) in the user's surrounding area; 2) provides a user with information including different level of risk notifications, including the program code triggering various alerts in certain defined (by the trained model) circumstances; 3) provides the user with feedback about objects and their locations sufficient to enable the user to estimate a distance of the object from the user; 4) inform the user of a location of an object, utilizing an estimated location defined by a grid (e.g., top-right corner); provides the user with zoom levels to enhances insights of the user into the information provided.

Figure 4:
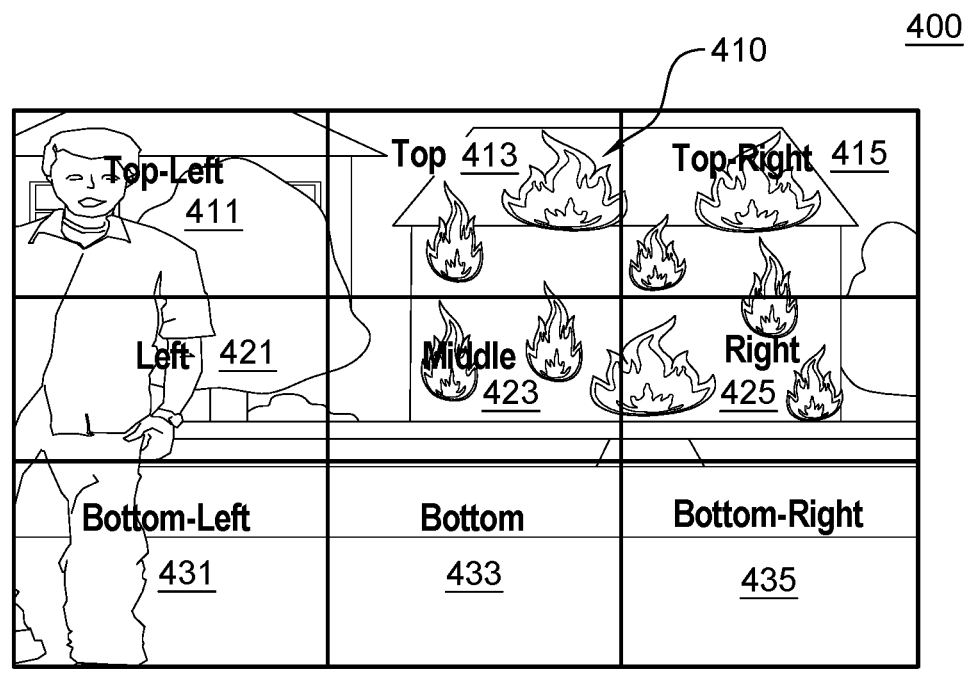
FIGS. 4-15 are visual simulations of the behavior of some embodiments of the present invention in various scenarios.
Figure 5:
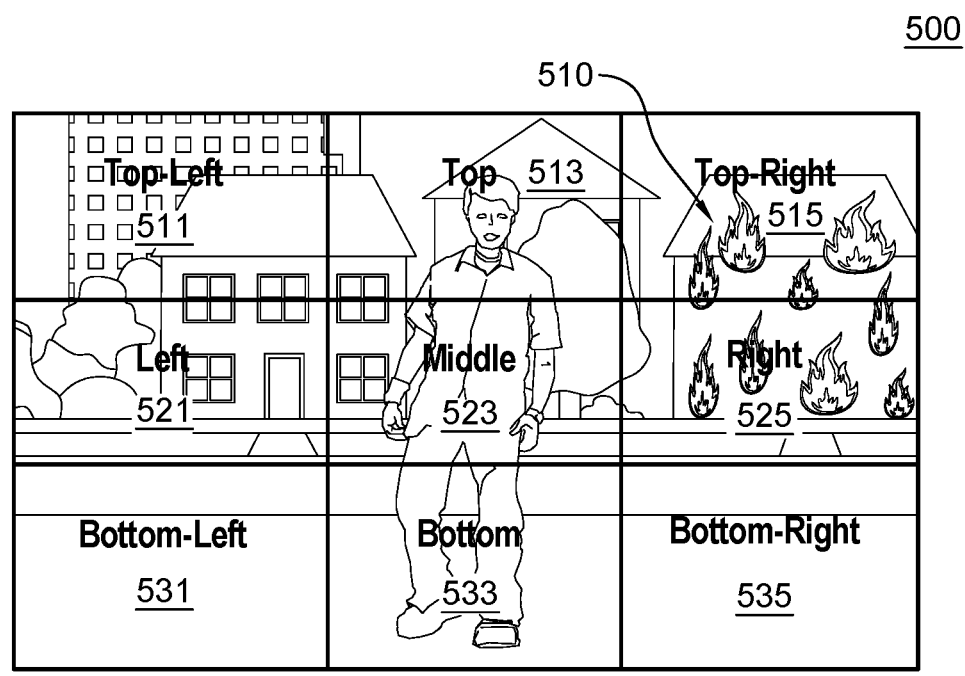
Figure 6:
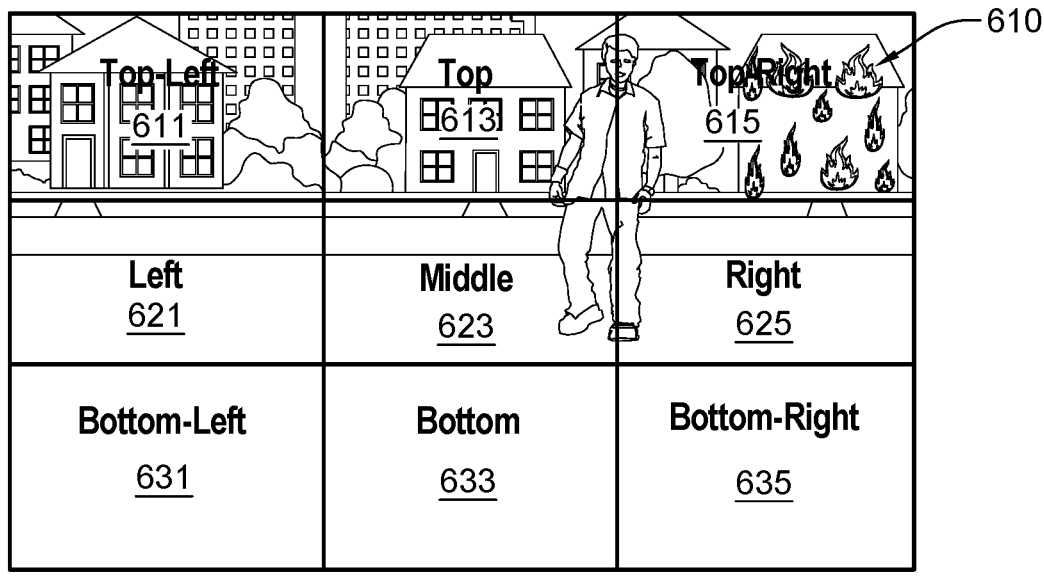

FIGS. 4-6 demonstrate various aspects of some embodiments of the present invention when the object is not moving but the user is moving. The object is without a defined size in these figures. As discussed above, a consistent grid is utilized in communications such that the user can comprehend the user's proximity to the perceived object(s) at any given time. FIGS. 4-6 all demonstrate the default mode of various embodiments of the present invention operates.

In FIG. 4, the grid 400 is in the default mode. The simulation provided in the grid 400 shows the perception of the program code (applying the generated model) of a fire 410, the object in this example. In this (non-limiting) example, the fire 410 is of a given size and the user is 2 m from the fire. The program code (applying the model) determined that the fire 410 is located across the top-view 413, top-right view 415, middle-view 423, and right-view 425, of the grid 400. The program code communicates, to the user, via the audio device, that the fire 410 is in all these areas of the grid and based on this communication, the user can comprehend that the fire 410 is large and hence, understand the magnitude of the threat posed by the fire 410.

In FIG. 5, the grid 500 is also in default mode and the simulation provided by the figure illustrates a fire 510 of the same size as in FIG. 4, but with a user in a position that is 5 m away from a fire 510 (as the user is moving away from the fire while utilizing as embodiment of the present invention). The program code (applying the model) determines that the fire 510 is located across the top-right view 515 and the right-view 525 and communicates, via the audio device, this location to the user. Based on this communication, the user can ascertain that the fire 510 is of a medium size (these are all relative sizes which are comprehended by the user based on the consistent use in embodiments of the present invention, of the grid).

Turning to FIG. 6, the illustration of the grid 600 in the default mode (again) simulates a fire 610 of the same actual size of the in FIGS. 4-5, but with a user position of 10 m away from a fire (as the user is moving away from the fire while utilizing an embodiment of the present invention). The program code indicates, via an audio output device, to the user that the fire 610 is located at the top-right view 615 of the grid 600. Based in this indication, the user can conclude that the fire is small. Given the space between the user and the fire 610, based on the indication provided by the program code, the user can avoid walking towards the direction of the fire 610.

Figure 7:
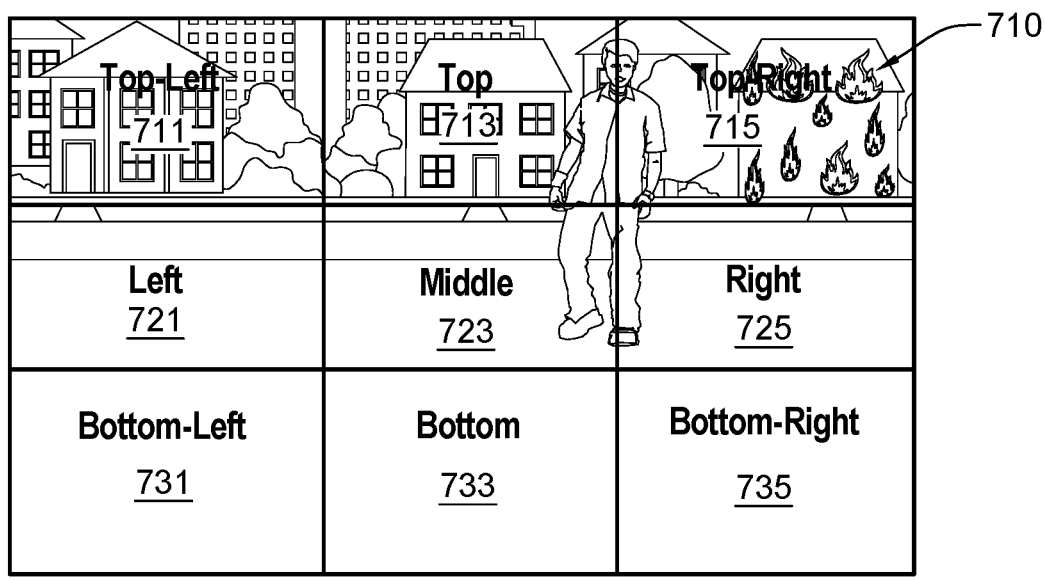
Figure 8:
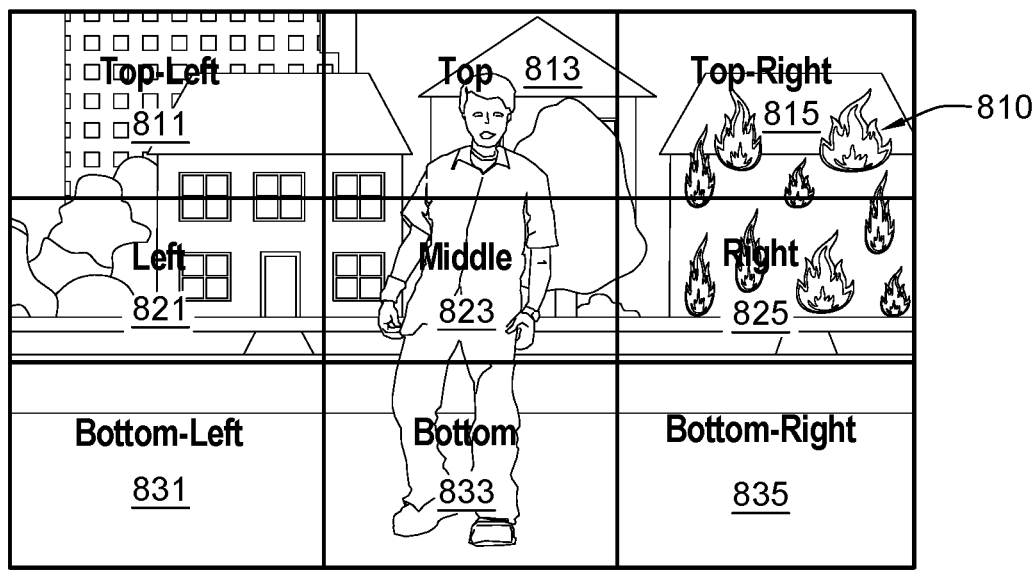
Figure 9:
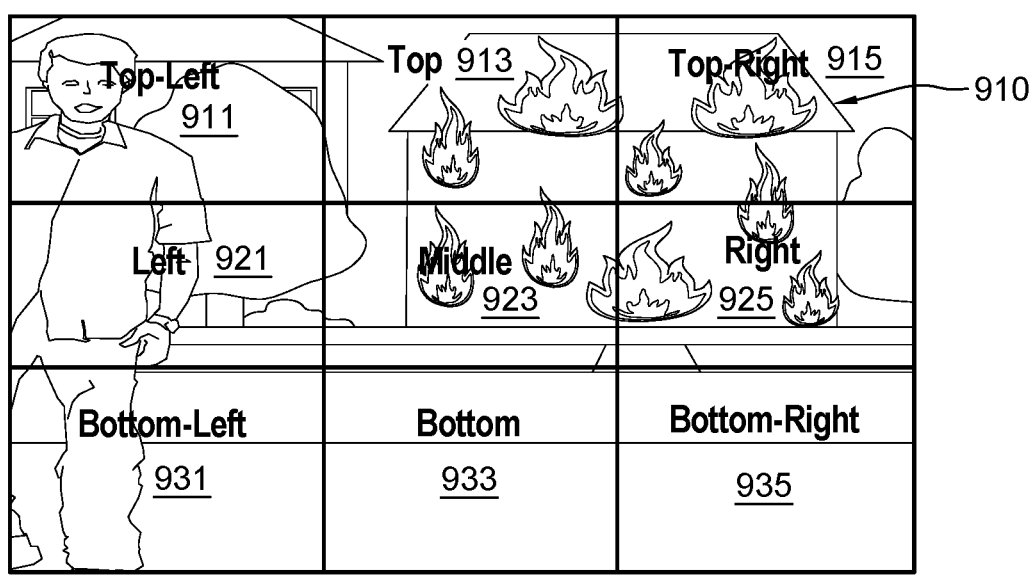

FIGS. 7-9 provide illustrations of various aspects of some embodiments of the present invention and the functionality of these aspects when a user is not moving and switching distance gauges. In this example, as with FIGS. 4-6, the objects are also fires and are without a defined size. FIG. 7 is an illustration of a default mode of some embodiments of the present invention, while FIG. 8 is an illustration of a semi-zoom mode, and FIG. 9 is an illustration of a zoom mode. The distance between the user and the fire in these figures is consistent because the user is stationary. Thus, the user can combine insights from the various views at the same positions to negotiate any danger posed by the fire (or any object detected and communicated by the program code).

FIG. 7 illustrates a grid 700 generated by the program code and represented, via, audio, to the user in a default setting, when the fire 710 is the same size as in FIGS. 4-6 and the user's position is 10 m away from a fire. As illustrated in FIG. 7, the program code communicates to the user, via audio, that the fire 710 was detected by the program code at the top-right view 715 of the grid 700. From this notification, the user can comprehend that the fire 710 is small in size and the threat is in a direction that is in front of the user.

FIG. 8 illustrates the grid 800 with the fire 810 of the same size as FIG. 7 and the user also 10 m away from a fire, but the view of FIG. 8, provided to the user via audio, is in the semi-zoom mode. As illustrated in FIG. 8, when the apparatus of the present invention is placed in the semi-zoom mode, in this example, the program code indicates to the user, via audio, that the fire 810 has been detected by the program code across the top-right view 815 and the right-view 825 of the grid 800. Based on this information, the user can conclude that the fire is of a medium size. The user can identify the direction of the fire (the threat) as being in from of the user, and the user can combine these insights from the semi-zoom mode with the aforementioned insights from the default mode.

FIG. 9 illustrated the grid 900 in a zoom mode in a situation with the same fire as FIGS. 7-8 and the user, again, at a position 10 m away from a fire. When user has selected the zoom mode (in some embodiments of the present invention, the mode can be selected by the program code to provide a view that best communicates any obstacles based on the position of the user relative to the detected objects), the program code indicated, via audio, to the user, that the fire was detected by the program code across the top-view 913, the top-right view 915, the middle-view 923, and the right-view 925. Based on the expanse of the fire relative to the grid, the user can conclude that the fire is of a large size. The user, as in the other views, can comprehend that there is a fire in front of the user and the user can combine the insights provided by the program code in this zoom view with insights from far view (default) and mid view (semi-zoom).

Figure 10:
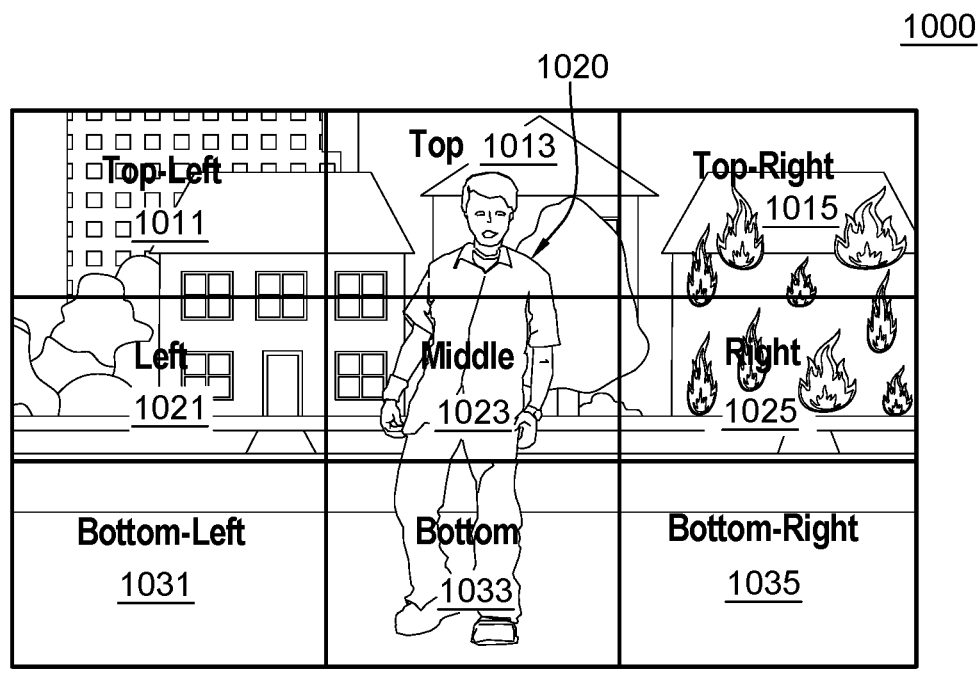
Figure 11:
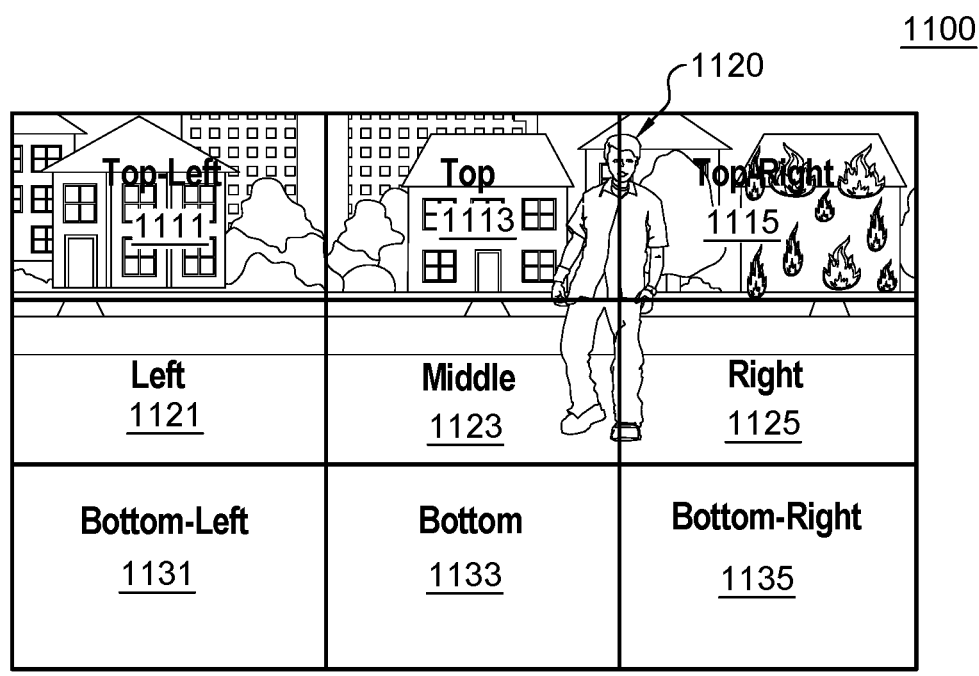
Figure 12:
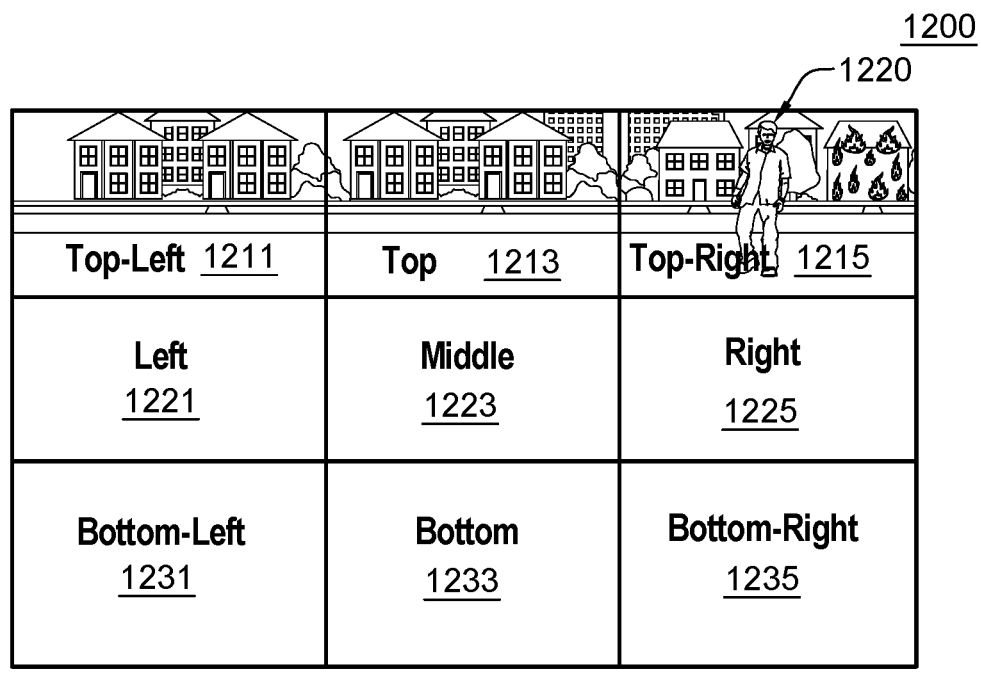

FIGS. 10-12 provide illustrations of various aspects of some embodiments of the present invention and the functionality of these aspects when a user is moving and the object, in these examples, a person (the same person in all examples), is not moving. In this example, the object is a person of a defined size. FIG. 10-12 is an illustration of a default mode of some embodiments of the present invention.

FIG. 10 illustrates an example of a grid 1000 with an embodiment of the present invention in a default mode. In this example, the program code has detected, modeled, and communicated a location of a person 1020 to a user where the person 1020 is 2 m away from the user. The program code indicates to the user, via audio, that the program code has detected the person 1020 across a top-view 1013, middle-view 1023, and bottom-view 1033, of the grid 1000. Thus, the user can comprehend from this notification that the person 1020 is 2 m in front of the user.

FIG. 11 illustrates an example of a grid 1100 as detected by the program code applying the model to the camera data, in a default mode where the (same) person 1120 is 5 m away from the user (on account of the user and not the person 1120 being in motion in this example). Based on the generated and customized model applied by the program code in this example, the program code provides no notification to the user because of the distance of the person 1120 from the user being far enough away that there is no reaction or interaction that would be appropriate for the user, relative to the person 1120. As the program code provides no notification (causing the device to provide no audio output), the user can understand that if an object was not detected, it is too far away to be defined clearly. This example illustrated the aforementioned advantage of embodiments of the present invention insofar as limiting notifications to what would be within a defined field of view. The model is trained in embodiments of the present invention to simulate a field of view of a user such that any user would be provided with audio information allowing the user to perceive visual stimuli limited to what would be reasonably visually perceived if this option were available to the user. Thus, the scope of information provided to the user by the program code is not distracting or extraneous but instead focused on providing information to the user that maintains the safety of the user when confronted by different objects on different environments and circumstances.

FIG. 12 illustrates an example of a grid 1200 as perceived in a default mode by the program code, based on applying the model to the image stream. The illustrated example, like in FIGS. 10-11, is the person 1220 (the same person as FIGS. 10-11) with a user in a position 10 m away from the person 1220 (because the user is moving but the person 1220 is not, in this example). In this example, based on applying the (trained) model to the program code, the program code will not transmit any audio message to the user. Hence, there will be no alert to the user via the audio. The reason that there is no communication is that the program code, by applying the model, has determined that the object, the person 1220, is too far to be defined clearly. Hence, because the person 1220 would not be in the vision field of the user, the program code, based on the training of the model and the pre-defined field of vision, would not communicate any location information to the user.

Figure 13:
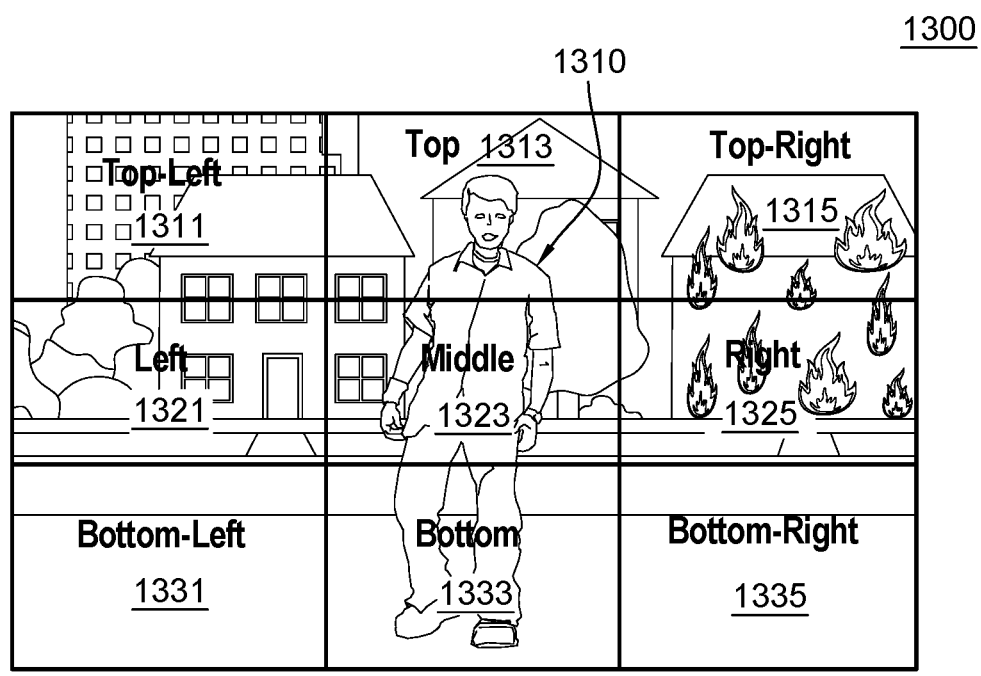
Figure 14:
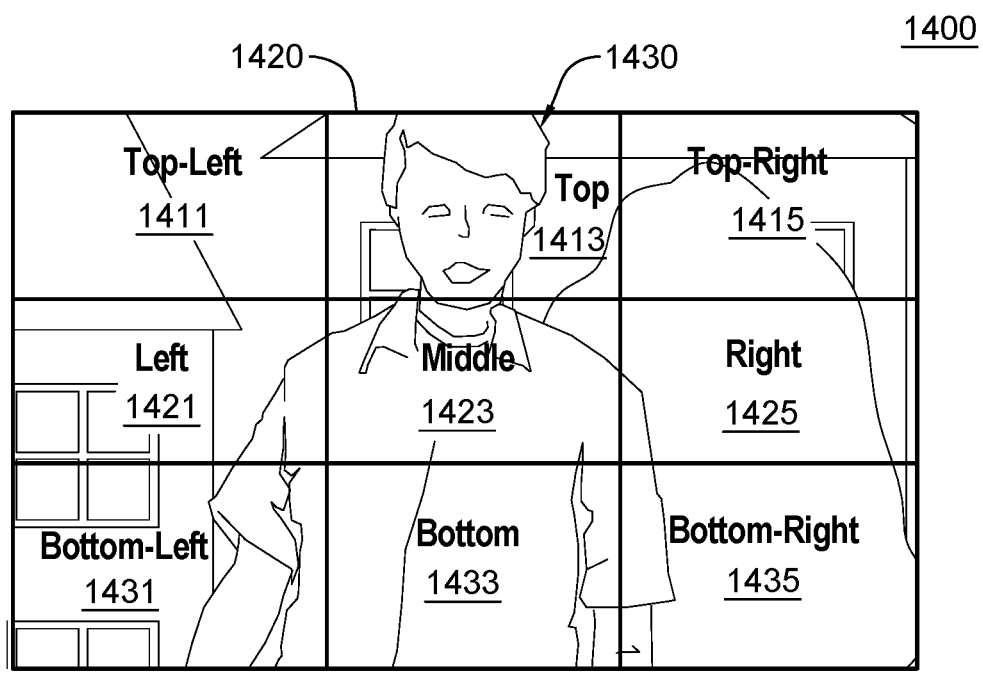
Figure 15:
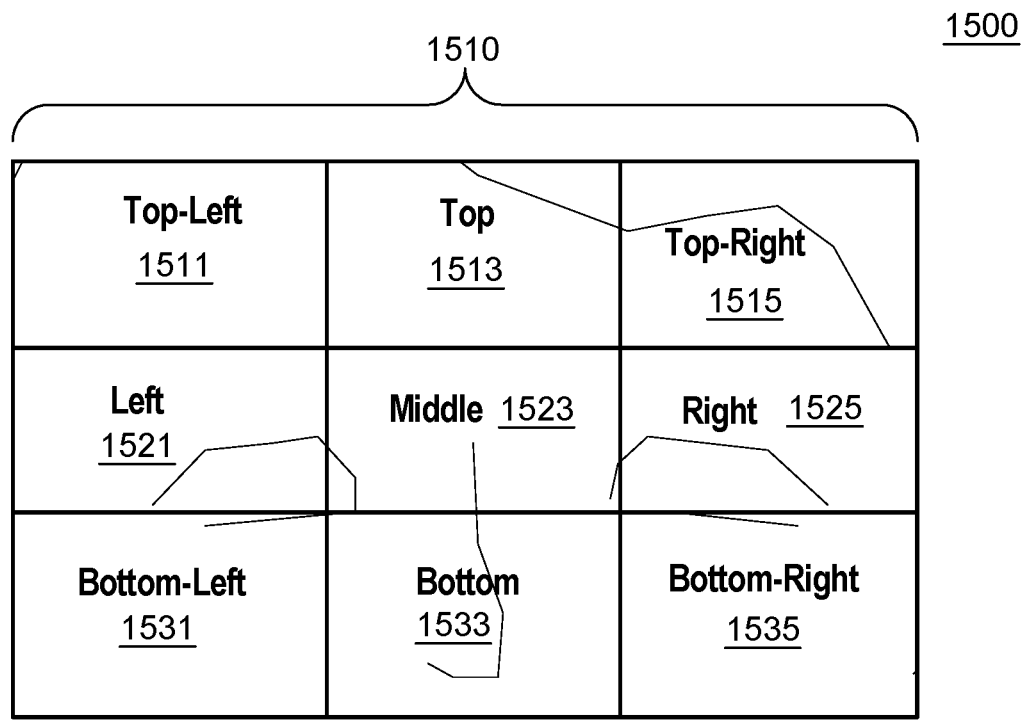

FIGS. 13-15 also demonstrate aspects of some embodiments of the present invention when a user is not moving (standing stationary), but the program code (automatically) and/or the user (manually) switches the distance gauge. In these figures, the objects being detected, analyzed utilizing the model, and communicated (or not) to the user are of a defined size. Hence, an example of a person as an object is again employed, as it was in FIGS. 10-12, for illustrative purposes, only and not to suggest any limitations to the functionality of embodiments of the present invention. FIG. 13 provides an example in a default view, FIG. 14 provides as example in a semi-zoom view, and FIG. 15 provides an example in a zoom view.

FIG. 13 provides a grid 1300 generated by program code in embodiments of the present invention when the view is a default view and a person 1310 is in a position such that the user is 2 m away from person 1310. The program code communicates, via the audio output, to the user, that the person 1310 is located across the top-view 1313, middle-view 1323, and bottom-view 1333, of the grid. Based on the notification received by the user from the program code, via the audio output, the user can ascertain that this person 1310 is 2 m in front of the user.

FIG. 14 depicts a grid 1400 in a semi-zoom mode in a perspective where the same person 1420 as in the prior example is, again 2 m away from the user (as the user is in the same position as in FIG. 13). In the semi-zoom mode, the program code applies the model to the camera feed (image feed) and determines, using visual recognition capabilities as well as the trained model, that a face 1430 of the person 1420 is detected across the top-view 1413, and the middle-view 1423. Thus, the program code can notify the user of this information and the user can understand from this notification that the face 1430 of the person 1420 is 2 m in front of the user.

FIG. 15 illustrates a grid 1500 with the same person 1520 as in the two prior figures, again, 2 m from the user (as the user is stationary). As illustrated in the grid 1500, the zoom is too close and if this were the field of vision of the user, the user could not perceive anything clearly based on being too close to the object. Hence, in some embodiments of the present invention, in this circumstance, the program code will not transmit to the user, via the audio output, any notification. In some embodiments of the present invention, the program code can prompt the user to switch to a different zoom setting as it is the choice of setting that limits the "view" of the user within the field of view defined by the grid 1500. When a user receives no notification from the device, the user can conclude that the user could try a different mode to gain insights about the field of view and/or that there are no objects within the field of view of the user that pose a safety risk to the user.

Embodiments of the present invention include a computer-implemented method, a computer program product, and a systems, where program code executing on one or more processors obtains, based on monitoring a defined vicinity of a user, via one or more input devices communicatively coupled to the one or more processors, the one or more input devices comprising an image capture device, environmental data comprising captured image data. The program code utilizes an image recognition agent and the captured image data from the defined vicinity to generate and train a model to provide artificial intelligence related to recognizing objects within the captured image data and to designate a location of the recognized objects within a mapped representation of physical space comprising the defined vicinity of the user, where the mapped representation comprises predefined locations. The program code identifies, based applying the trained model to captured image data from a given time, one or more objects in the defined vicinity of the user and determining a location for each of the one or more objects comprising, where the location for each object of the one or more objects comprises presence or absence of the object in each of the predefined locations. The program code determines, for each of the identified one or more objects in the defined vicinity, whether to trigger a notification to the user, where the notification comprises content identifying an identified object and the predefined locations in which the object is present, and where the determining for each of the one or more identified objects is based on a proximity of the object from the user.

In some embodiments of the present invention, the program code determining comprises determining that at least a portion of the identified one or more objects trigger the notification, the method further comprising: the program code translating the triggered notification into audio content; and the program code communicating the audio content to the user via an audio output device communicatively coupled to the one or more processors.

In some embodiments of the present invention, the mapped representation is a grid and the predefined locations are named squares comprising the grid, and the notification to the user for a given identified object of the one or more objects comprises names for each of the named squares where the given object is present.

In some embodiments of the present invention, the program code designates a zoom level from a pre-defined selection of zoom levels, where the designated zoom level sets metes and bounds of defined vicinity, where the determining whether to trigger the notification is based on the designated zoom level. In some embodiments, the program code designating the zoom level is based on the program code receiving a user input a device of the one or more input devices, where the device is selected from the group consisting of: a device comprising the image capture device and a device communicatively coupled to the image capture device.

In some embodiments of the present invention, at least one device of the image capture device and the audio output device comprises a wearable device.

In some embodiments of the present invention, each object of the identified one or more objects in the defined vicinity is selected from the group consisting of: an object that change size over time, and an object of consistent size over time.

In some embodiments of the present invention, the program code determining comprises determining that at least a portion of the identified one or more objects do not trigger the notification, based on a location of the portion in the mapped representation indicating a proximity of the portion to the user being outside of a threshold distance. In some embodiments of the present invention, the threshold distance is based on the selected zoom level, and the proximity of the portion is selected from a distance outside of the threshold distance consisting of: a distance lesser than the threshold distance and distance greater than the threshold distance.

In some embodiments of the present invention, during the identifying, by the program code, the user is either in-motion or stationary.

In some embodiments of the present invention, each object of the identified one or more objects in the defined vicinity is selected from the group consisting of: an object that is stationary, and an object that is in-motion.

Referring now to FIG. 16, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the one or more of the elements of the computing system 100 of FIG. 1, including but not limited to the one or more processors 110, the device 130, and the audio output 150 can each comprise a cloud computing node 10 (FIG. 16) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 17:
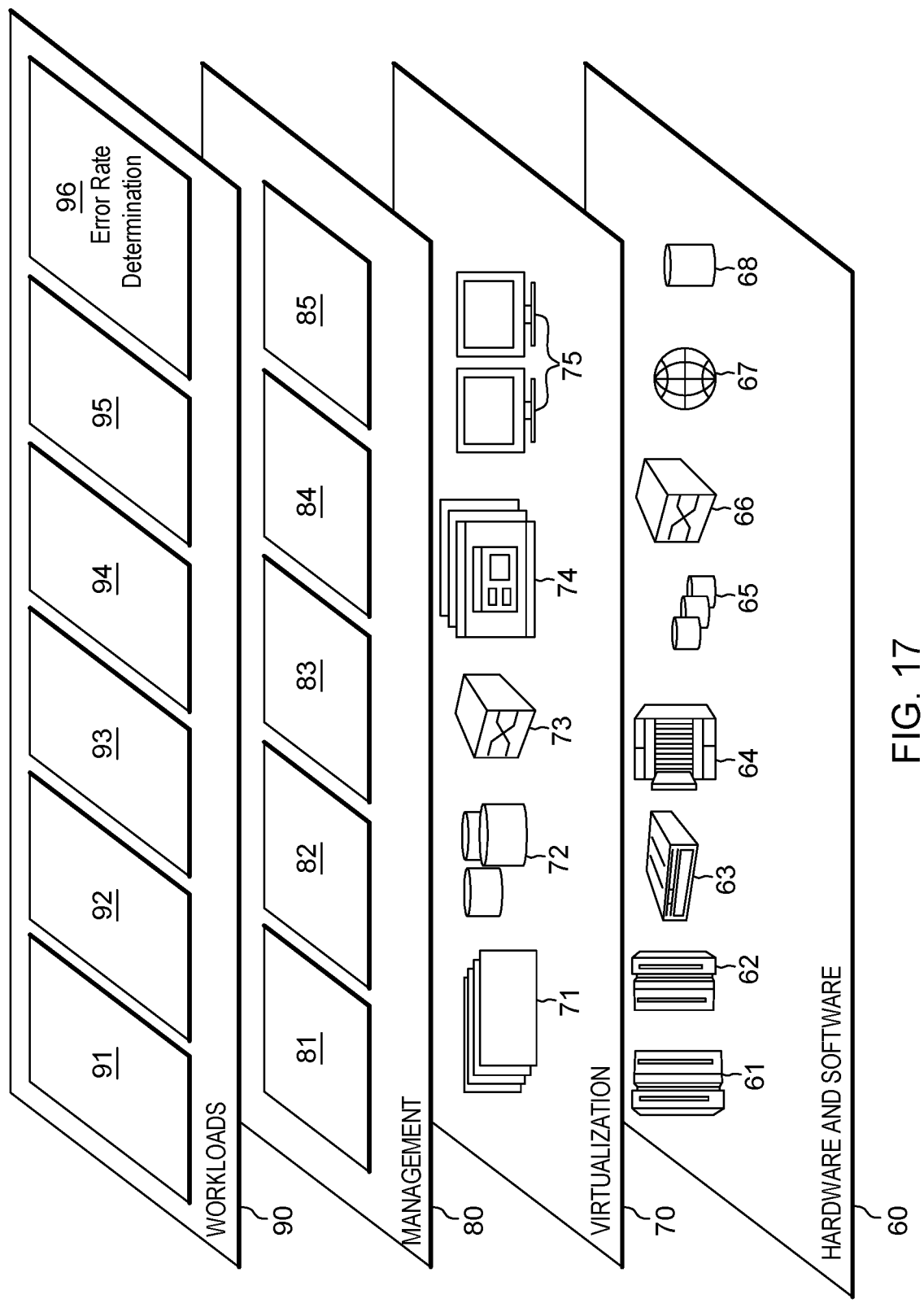
FIG. 17 depicts a cloud computing environment according to an embodiment of the present invention.

Referring now to FIG. 17, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 17 are intended to be illustrative only and that computing nodes 10 and cloud computing environment 50 can communicate with any type of computerized device over any type of network and/or network addressable connection (e.g., using a web browser).

Figure 18:
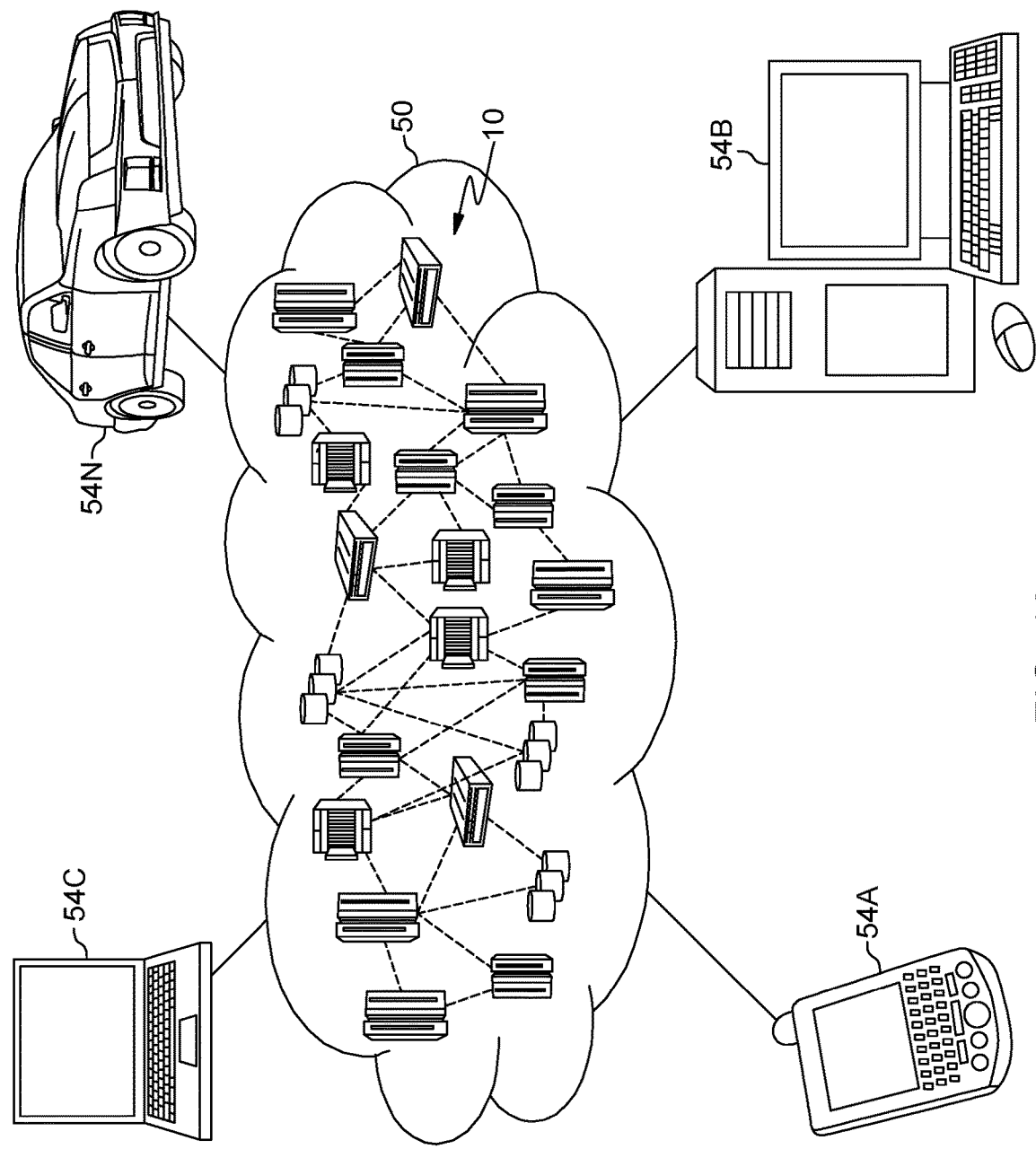
FIG. 18 depicts abstraction model layers according to an embodiment of the present invention.

Referring now to FIG. 18, a set of functional abstraction layers provided by cloud computing environment 50 (FIG. 17) is shown. It should be understood in advance that the components, layers, and functions shown in FIG. 18 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and obtaining, interpreting, and delivering, data describing objects with a field of vison of a user, via an audio device to alert a user to objects within this vicinity in a manner that enables the user to comprehend the location and any concerns (including safety concerns) related to the objects 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   obtaining, by one or more processors, based on monitoring a defined vicinity of a user, via one or more input devices communicatively coupled to the one or more processors, the one or more input devices comprising an image capture device, environmental data comprising captured image data;
   utilizing, by the one or more processors, an image recognition agent and the captured image data from the defined vicinity to generate and train a model to provide artificial intelligence related to recognizing objects within the captured image data and to designate a location of the recognized objects within a mapped representation of physical space comprising the defined vicinity of the user, wherein the mapped representation comprises predefined locations;
   identifying, by the one or more processors, based applying the trained model to captured image data from a given time, one or more objects in the defined vicinity of the user and determining a location for each of the one or more objects comprising, wherein the location for each object of the one or more objects comprises presence or absence of the object in each of the predefined locations; and
   determining, by the one or more processors, for each of the identified one or more objects in the defined vicinity, whether to trigger a notification to the user, wherein the notification comprises content identifying an identified object and the predefined locations in which the object is present, and wherein the determining for each of the one or more identified objects is based on a proximity of the object from the user.

2. The computer-implemented method of claim 1, wherein the determining comprises determining that at least a portion of the identified one or more objects trigger the notification, the method further comprising:
   translating, by the one or more processors, the triggered notification into audio content; and
   communicating, by the one or more processors, the audio content to the user via an audio output device communicatively coupled to the one or more processors.

3. The computer-implemented method of claim 1, wherein the mapped representation is a grid and the predefined locations are named squares comprising the grid, and wherein the notification to the user for a given identified object of the one or more objects comprises names for each of the named squares where the given object is present.

4. The computer-implemented method of claim 1, the method further comprising:
   designating, by the one or more processors, a zoom level from a pre-defined selection of zoom levels, wherein the designated zoom level sets metes and bounds of defined vicinity, wherein the determining whether to trigger the notification is based on the designated zoom level.

5. The computer-implemented method of claim 4, wherein the designating is based on receiving a user input a device of the one or more input devices, wherein the device is selected from the group consisting of: a device comprising the image capture device and a device communicatively coupled to the image capture device.

6. The computer-implemented method of claim 2, wherein at least one device of the image capture device and the audio output device comprises a wearable device.

7. The computer-implemented method of claim 1, where each object of the identified one or more objects in the defined vicinity is selected from the group consisting of: an object that change size over time, and an object of consistent size over time.

8. The computer-implemented method of claim 4, wherein the determining comprises determining that at least a portion of the identified one or more objects do not trigger the notification, based on a location of the portion in the mapped representation indicating a proximity of the portion to the user being outside of a threshold distance.

9. The computer-implemented method of claim 8, wherein the threshold distance is based on the selected zoom level, and wherein the proximity of the portion is selected from a distance outside of the threshold distance consisting of: a distance lesser than the threshold distance and distance greater than the threshold distance.

10. The computer-implemented method of claim 1, wherein during the identifying the user is either in-motion or stationary.

11. The computer-implemented method of claim 1, where each object of the identified one or more objects in the defined vicinity is selected from the group consisting of: an object that is stationary, and an object that is in-motion.

12. A computer program product comprising:
a computer readable storage medium readable by one or more processors of a shared computing environment and storing instructions for execution by the one or more processors for performing a method comprising:
  obtaining, by the one or more processors, based on monitoring a defined vicinity of a user, via one or more input devices communicatively coupled to the one or more processors, the one or more input devices comprising an image capture device, environmental data comprising captured image data;
  utilizing, by the one or more processors, an image recognition agent and the captured image data from the defined vicinity to generate and train a model to provide artificial intelligence related to recognizing objects within the captured image data and to designate a location of the recognized objects within a mapped representation of physical space comprising the defined vicinity of the user, wherein the mapped representation comprises predefined locations;
  identifying, by the one or more processors, based applying the trained model to captured image data from a given time, one or more objects in the defined vicinity of the user and determining a location for each of the one or more objects comprising, wherein the location for each object of the one or more objects comprises presence or absence of the object in each of the predefined locations; and
  determining, by the one or more processors, for each of the identified one or more objects in the defined vicinity, whether to trigger a notification to the user, wherein the notification comprises content identifying an identified object and the predefined locations in which the object is present, and wherein the determining for each of the one or more identified objects is based on a proximity of the object from the user.

13. The computer program product of claim 12, wherein the determining comprises determining that at least a portion of the identified one or more objects trigger the notification, the method further comprising:
  translating, by the one or more processors, the triggered notification into audio content; and
  communicating, by the one or more processors, the audio content to the user via an audio output device communicatively coupled to the one or more processors.

14. The computer program product of claim 12, wherein the mapped representation is a grid and the predefined locations are named squares comprising the grid, and wherein the notification to the user for a given identified object of the one or more objects comprises names for each of the named squares where the given object is present.

15. The computer program product of claim 12, the method further comprising:
  designating, by the one or more processors, a zoom level from a pre-defined selection of zoom levels, wherein the designated zoom level sets metes and bounds of defined vicinity, wherein the determining whether to trigger the notification is based on the designated zoom level.

16. The computer program product of claim 15, wherein the designating is based on receiving a user input a device of the one or more input devices, wherein the device is selected from the group consisting of: a device comprising the image capture device and a device communicatively coupled to the image capture device.

17. The computer program product of claim 13, wherein at least one device of the image capture device and the audio output device comprises a wearable device.

18. The computer program product of claim 12, where each object of the identified one or more objects in the defined vicinity is selected from the group consisting of: an object that change size over time, and an object of consistent size over time.

19. The computer program product of claim 15, wherein the determining comprises determining that at least a portion of the identified one or more objects do not trigger the notification, based on a location of the portion in the mapped representation indicating a proximity of the portion to the user being outside of a threshold distance.

20. A computer system comprising:
a memory;
one or more processors in communication with the memory;
program instructions executable by the one or more processors in a shared computing environment via the memory to perform a method, the method comprising:
  obtaining, by the one or more processors, based on monitoring a defined vicinity of a user, via one or more input devices communicatively coupled to the one or more processors, the one or more input devices comprising an image capture device, environmental data comprising captured image data;
  utilizing, by the one or more processors, an image recognition agent and the captured image data from the defined vicinity to generate and train a model to provide artificial intelligence related to recognizing objects within the captured image data and to designate a location of the recognized objects within a mapped representation of physical space comprising the defined vicinity of the user, wherein the mapped representation comprises predefined locations;
  identifying, by the one or more processors, based applying the trained model to captured image data from a given time, one or more objects in the defined vicinity of the user and determining a location for each of the one or more objects comprising, wherein the location for each object of the one or more objects comprises presence or absence of the object in each of the predefined locations; and
  determining, by the one or more processors, for each of the identified one or more objects in the defined vicinity, whether to trigger a notification to the user, wherein the notification comprises content identifying an identified object and the predefined locations in which the object is present, and wherein the determining for each of the one or more identified objects is based on a proximity of the object from the user.

* * * * *